(12) United States Patent
Itou

(10) Patent No.: US 7,471,194 B2
(45) Date of Patent: Dec. 30, 2008

(54) TROUBLE TICKET SERVICE SYSTEM, MONITORING APPARATUS, AND TROUBLE TICKET SERVICE METHOD; FOR TROUBLE TICKET SERVICE SYSTEM AND MONITORING APPARATUS USE

(75) Inventor: Yoshio Itou, Tokyo (JP)

(73) Assignee: NEC Corporation, Tokyo (JP)

( * ) Notice: Subject to any disclaimer, the term of this patent is extended or adjusted under 35 U.S.C. 154(b) by 358 days.

(21) Appl. No.: 11/452,287

(22) Filed: Jun. 14, 2006

(65) Prior Publication Data

US 2007/0013508 A1   Jan. 18, 2007

(30) Foreign Application Priority Data

Jun. 15, 2005   (JP) .............................. 2005-174441

(51) Int. Cl.
   *G08B 23/00*   (2006.01)
(52) U.S. Cl. ...................... 340/500; 340/3.43; 340/506; 340/522; 714/48
(58) Field of Classification Search ................. 340/500, 340/3.43, 501, 506, 517, 521, 522; 455/404.1; 370/445; 714/48, 49, 799
   See application file for complete search history.

(56) References Cited

U.S. PATENT DOCUMENTS 3,839,707 A * 10/1974 Woodward et al. ............. 714/4
4,273,955 A *  6/1981 Armstrong ................ 178/69 G

FOREIGN PATENT DOCUMENTS

JP   2003-5827   1/2003

* cited by examiner

*Primary Examiner*—Toan N Pham
(74) *Attorney, Agent, or Firm*—Dickstein, Shapiro, LLP.

(57) ABSTRACT

A trouble ticket service system is capable of notifying information indicating the actual operation state thereof. A monitoring apparatus includes information analyzing software for distinguishing, according to alarm information and received electric field information from a microwave communication system including microwave communication apparatuses, the three states namely: device failure state, fading state, and early warning state, plus a mail transmitter for sending the three states as trouble tickets (e-mail messages).

16 Claims, 5 Drawing Sheets

TROUBLE TICKET SERVICE SYSTEM, MONITORING APPARATUS, AND TROUBLE TICKET SERVICE METHOD; FOR TROUBLE TICKET SERVICE SYSTEM AND MONITORING APPARATUS USE

BACKGROUND OF THE INVENTION

1. Field of the Invention

The present invention relates to a trouble ticket service system, a monitoring apparatus, and a trouble ticket service method to be used with the trouble ticket service system and the monitoring apparatus, particularly to a trouble ticket service system for the issuance of a trouble ticket (via electronic mail) notifying the information of failure, a fading state and long lasting reduction of electric field intensity in a propagation section.

2. Description of the Conventional Art

A trouble ticket service system includes a microwave communication system as an object to be monitored, a module to monitor a state of failure in a microwave communication apparatus of the microwave communication system, a module to automatically send a message by electronic mail or an e-mail message notifying the state of failure, and a module to receive the e-mail message.

In a system configured as mentioned above, when failure occurs in the microwave communication apparatus of the microwave communication system or when intensity of the received electric field is less than an alarm level, the information of the state is transferred to an alarm monitoring device, e.g., a personal computer (PC). When the alarm information is received, the alarm monitor automatically creates a trouble ticket (as an e-mail message) to transmit the ticket.

In this connection, there has also been a proposed remote monitoring system that sends, like the trouble ticket service system, a message by e-mail to notify detection of the state according to the monitored information. Reference is created as, e.g., Japanese Patent Application Laid-Open No. 2003-005827.

For instance, when fading occurs in the trouble ticket service system, the alarm message is frequently delivered to the alarm monitoring apparatus even if there is no occurrence of failure in the microwave communication apparatus. It is hence likely that a trouble ticket is issued each time fading takes place. This leads to a problem in the microwave communication system, that an actual state of the system cannot be indicated by the alarm information only.

Moreover, there exists another problem: when the received electric field intensity is lowered constantly (not dropping into the alarm state) in the trouble ticket service system because of, e.g., a building constructed in the way of electromagnetic waves or a wrong angle of an antenna caused by a strong wind, the system is in an abnormal state which cannot be notified.

SUMMARY OF THE INVENTION

It is therefore an aim of the present invention to provide a trouble ticket service system, a monitoring apparatus, and a trouble ticket service method and a program to use with the trouble ticket service system and the monitoring apparatus.

There is a trouble ticket service system provided with a monitoring apparatus for receiving alarm information and received electric field information sent from a microwave communication system including at least a microwave communication apparatus. The monitoring apparatus includes an analyzing module which analyzes the alarm information and the received electric field information and thereby distinguishing three states from each other. The three states namely: device failure state, fading state, and early warning state, with a transmitting module for sending the three states as trouble tickets.

A monitoring apparatus is provided for receiving alarm information and received electric field information sent from a microwave communication system, including at least a microwave communication apparatus. The monitoring apparatus includes an analyzing module which analyzes the alarm information and the received electric field information and thereby distinguishing three states from each other. The three states namely: device failure state, fading state, and early warning state, with a transmitting module for sending the three states as trouble tickets.

A trouble ticket service method is provided for use with a system comprising a monitoring apparatus for receiving alarm information and received electric field information sent from a microwave communication system, including at least a microwave communication apparatus. The monitoring apparatus first executes the process of analyzing the alarm information and the received electric field information and thereby distinguishing three states from each other namely: device failure state, fading state, and early warning state; and then secondly processes sending the three states as trouble tickets.

A program for the trouble ticket service method is also provided for use with a trouble ticket service system comprising a monitoring apparatus for receiving alarm information and received electric field information sent from a microwave communication system including at least a microwave communication apparatus. The program causes a computer of the monitoring apparatus to execute the first process which is analyzing the alarm information and the received electric field information, thereby distinguishing three states from each other namely: device failure state, fading state, and early warning state; and then the second process which is sending the three states as trouble tickets.

In conclusion, trouble ticket service system in accordance with the present invention includes a microwave communication apparatus that has a module to detect a device alarm state to send information of the alarm state, and a module to send information of the received electric field. The system further includes a module to collect the information items from the microwave communication apparatus to monitor it, software to automatically analyze the information thus collected, and a mail transmission module. Due to the system configuration, the system operation states are classified into a device failure state, a fading state, and an early warning state. The mail transmission module automatically sends an e-mail message directly notifying the system operation state.

As the result of the classified operation states of trouble tickets as well as the device failure, fading, and early warning states, the trouble ticket service system can appropriately recognize the operation state, which is not possible in the conventional art. Since three operation states (device failure, fading, and early warning states) can be obtained in the trouble ticket service system, it is advantageously possible to immediately deal with the pertinent operation state.

According to the configuration and operation described below, it is possible to notify information of an actual operation state of the trouble ticket service system.

BRIEF DESCRIPTION OF THE DRAWINGS

The objects and features of the present invention will become more apparent by considering the following detailed description taken in conjunction with the accompanying drawings in which.

DESCRIPTION OF THE OUTLINES

Figure 1:
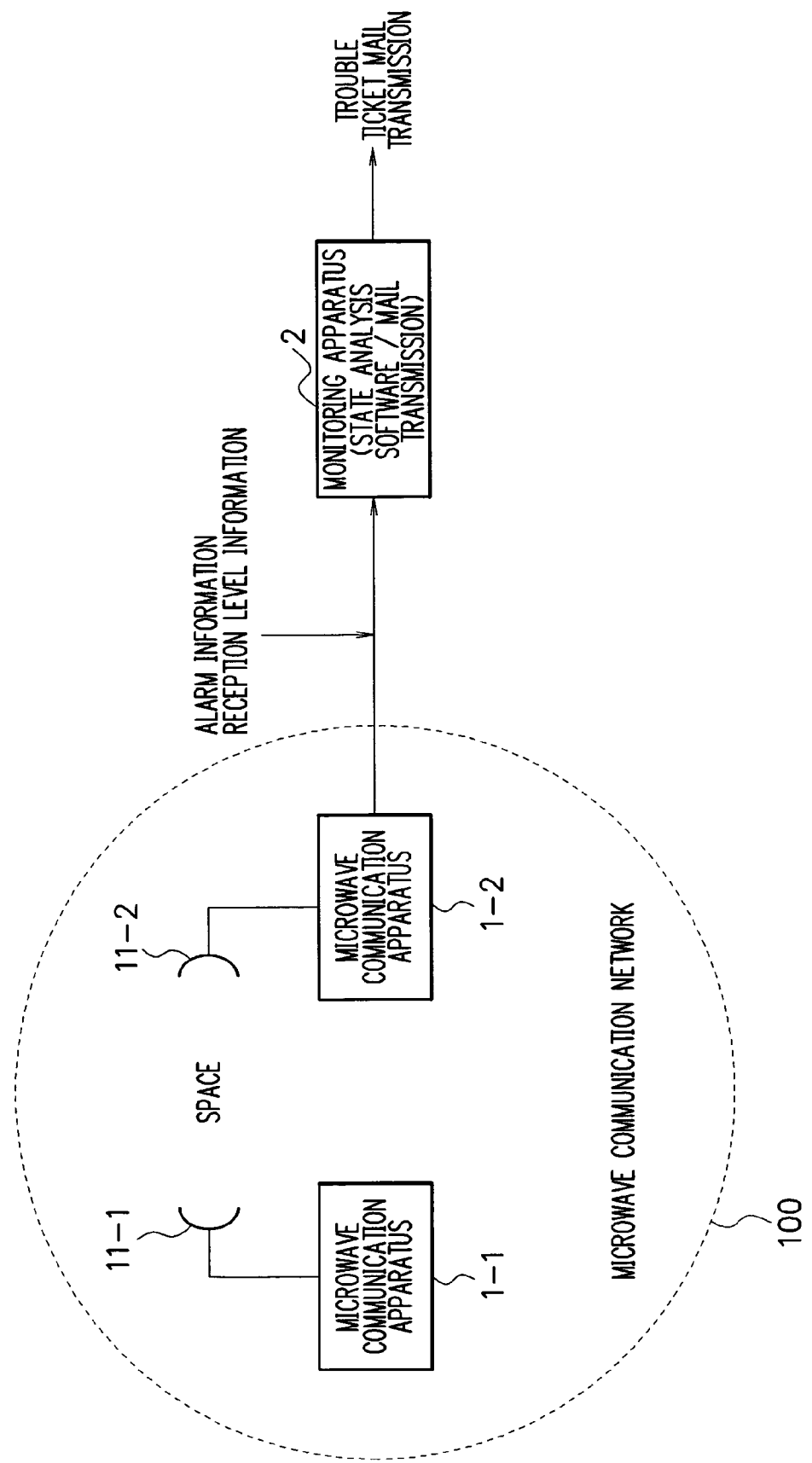
FIG. 1 is a block diagram showing the configuration of the outline of the trouble ticket service system.

Referring next to the drawings, a description will be given to an outline in accordance with the present invention. FIG. 1 shows structure of an outline of the trouble ticket service system in a block diagram. The system includes a microwave communication system 100 including microwave communication apparatuses 1-1 and 1-2 respectively, comprising antennas 11-1 and 11-2 to communicate microwaves through a space and a monitoring apparatus 2 to monitor the communication system 100.

The monitoring unit 2 includes information analysis software and a mail transmitting module. The software automatically analyzes alarm information and received electric field information sent from the communication units 1-1 and 1-2 to classify the contents of alarm information into a device failure state, a fading state, or an early warning state. The mailing unit receives the information of the state from the software to transmit the state via e-mail in the format of a trouble ticket to a receiver terminal of, e.g., maintenance engineer.

Figure 2:
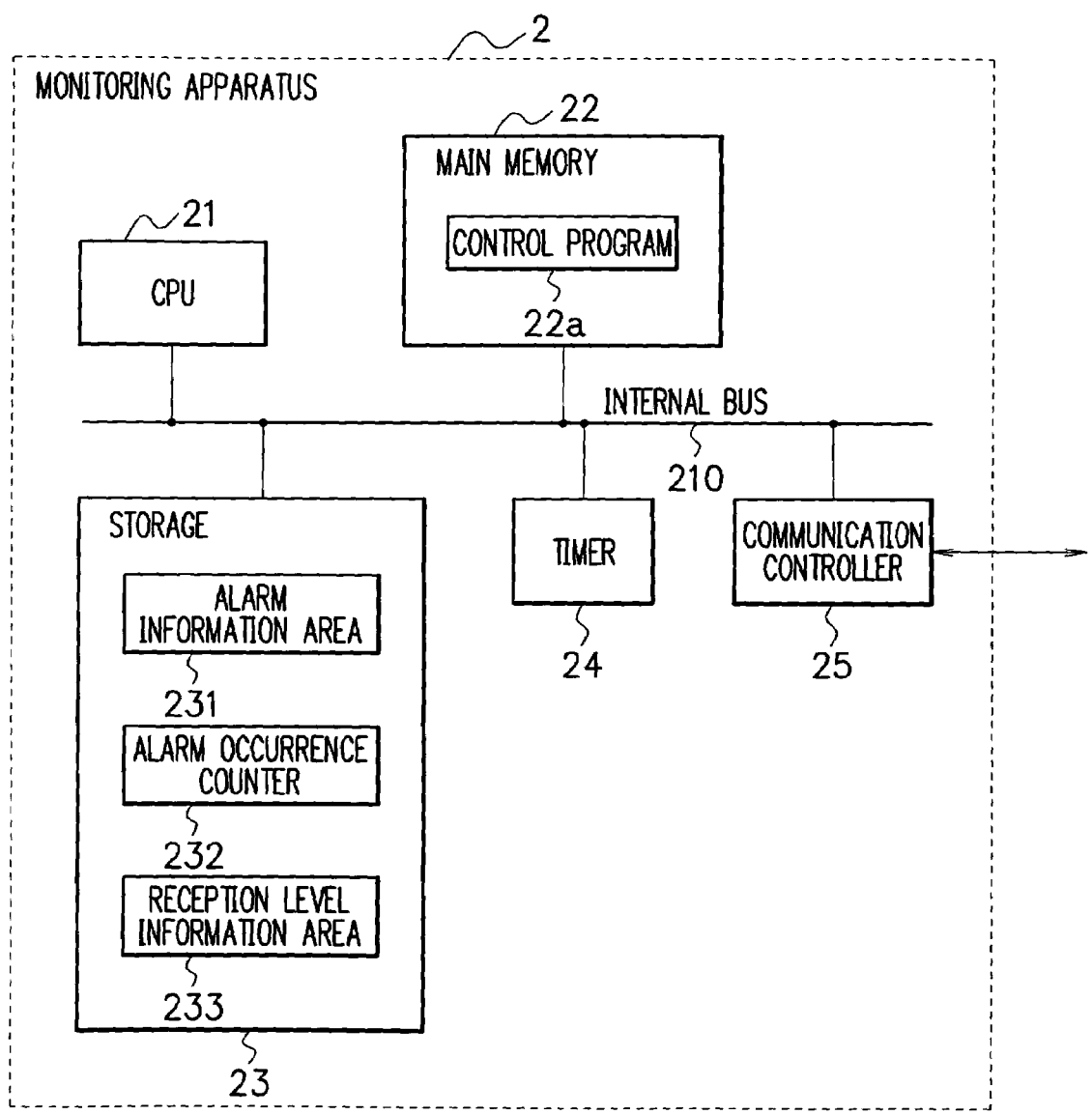
FIG. 2 is a schematic block diagram showing the configuration of the monitoring apparatus in FIG. 1.

FIG. 2 shows a configuration of the monitoring unit 2 of FIG. 1 in a block diagram. The unit 2 includes a Central Processing Unit (CPU) 21 to execute various processes such as processing of the information analysis software and that of the mail transmission unit, a main memory 22 to store a control program 22a that the CPU 21 executes, a storage section 23 to be used as a work area by the CPU 21 to execute the control program 22a, a timer 24, a communication control unit 25 to control communication with the microwave communication system 100 and communication of e-mail data, and an internal bus 210. The bus 210 is disposed to connect the CPU 21, the main memory 22, the storage section 23, the timer 24, and the communication controller 25 to each other.

The storage section 23 includes an alarm information area 231 to store information such as the alarm information sent from the microwave communication system 100 (the microwave communication modules 1-1 and 1-2), an alarm occurrence counter 232 to count the number of alarm events according to the alarm information, and a reception level information area 233 to store information such as the received electric field information.

Figure 3:
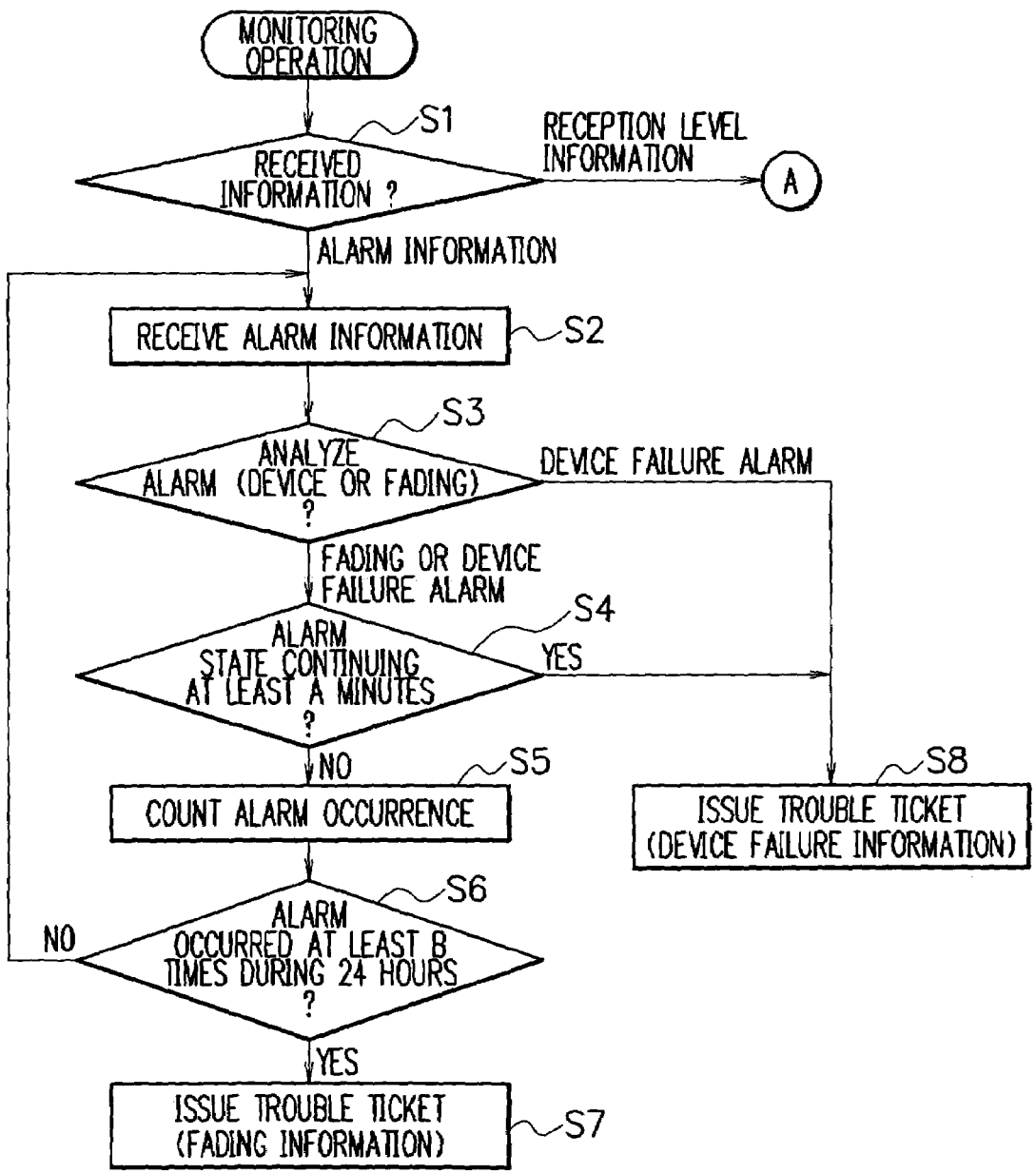
FIG. 3 is a flowchart showing the operation of the monitoring apparatus in FIG. 1.
Figure 4:
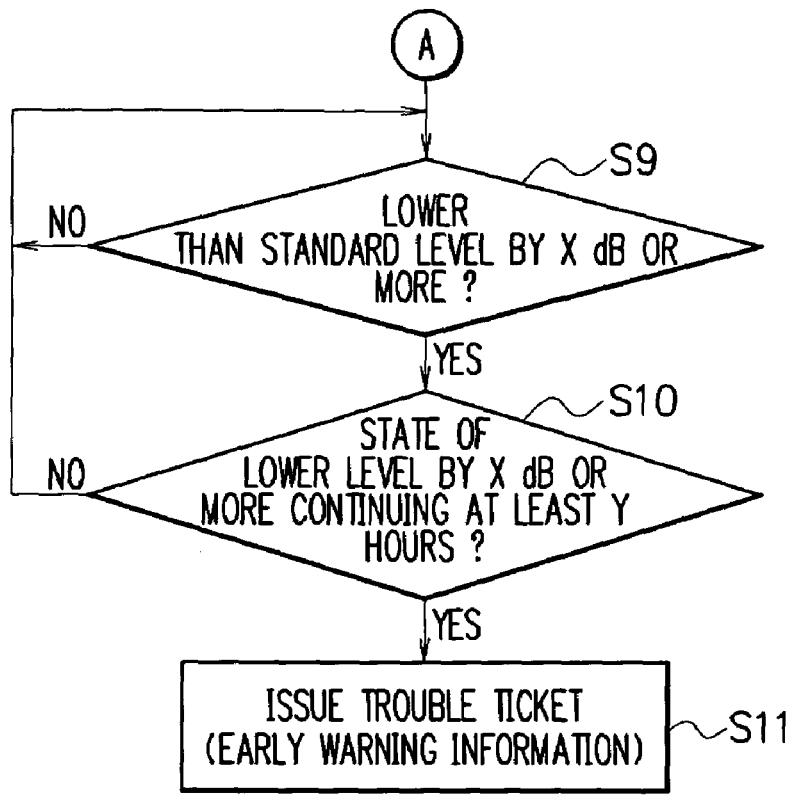
FIG. 4 is a flowchart showing the operation of the monitoring apparatus in FIG. 1.

FIGS. 3 and 4 show the operation of the monitoring apparatus 2 of FIG. 1 in flowcharts. Referring now to FIGS. 1 to 4, description will be given of the outline of the trouble ticket service system in accordance with the present invention. Processing of FIGS. 3 and 4 is implemented when the CPU 21 of the monitoring device 2 executes the control program 22a.

The monitoring device 2 first checks to determine whether the contents of alarm information indicate device failure or fading (step S3 of FIG. 3). If it is determined that the alarm indicates device failure, the monitoring device 2 will issue a trouble ticket denoting a state of device failure (step S8 of FIG. 3).

If it is not possible to determine whether the alarm is associated with device failure or fading, the monitoring apparatus 2 will check to determine whether the alarm state continues at least in A minutes, e.g., 20 minutes designated in advance (step S4 of FIG. 3). In the monitoring apparatus 2, the alarm state information is kept in the alarm information area 231 of the storage section 23 to detect a lapse of A minutes by the timer 24.

If the alarm state continues in A minutes or more, the monitoring apparatus 2 assumes that the alarm state indicates a state of device failure and will issue a trouble ticket of a device failure state (step S8 of FIG. 3). If the alarm state is restored to an ordinary state within A minutes, the monitoring apparatus 2 counts the alarm events by the counter 232 (step S5 of FIG. 3). If the number of alarm events is equal to or more than B, e.g., ten (10) within a predetermined period of time, e.g., one (1) day (step S6 of FIG. 3), the monitoring apparatus 2 assumes that the alarm is associated with a transmission state such as fading in the propagation interval to issue a trouble ticket indicating a fading state (step S7 of FIG. 3).

When reception level information other than the alarm information is received from the microwave communication system 100 (step S1 of FIG. 3), the monitoring unit 2 will check to determine whether the reception level is less than the standard received electric field level (dB) by at least X decibels, e.g., ten (10) decibels (step S9 of FIG. 3). The monitoring unit 2 keeps the reception level information in the reception level area 233 of the storage section 23.

If the reception level is lower than the standard level by at least X decibels, the monitoring device 2 continuously measures how long the state continues. If the state continues in a period of time equal to or more than Y hours, e.g., 24 hours (step S10 of FIG. 4), the monitoring device 2 issues a trouble ticket "Early Warning State" (step S11 of FIG. 4). In the description, letters A, B, X, and Y are values set in advance. However, the values are not restricted by the example above.

In the outline, the monitoring unit 2 includes software to switch alarms between an alarm due to device failure and an alarm due to an abnormality in the state of the propagation interval such as fading. The embodiment also includes a function to monitor the propagation state of the interval for a long period suitable for the operation and software which will distinguish, according to the result of the monitoring operation, the fading state from the early warning state. Therefore, it is possible to determine three states namely: the device failure state, the fading state, and the early warning state.

Figure 5:
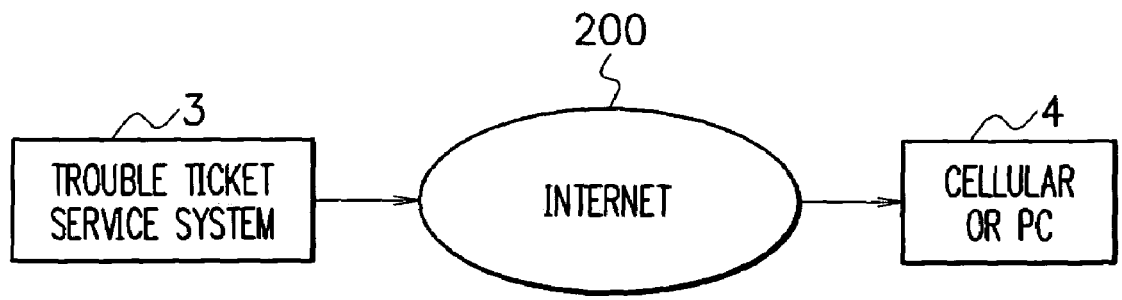
FIG. 5 is a block diagram showing the process to issue a trouble ticket in the outline of the trouble ticket service system.
Figure 6:
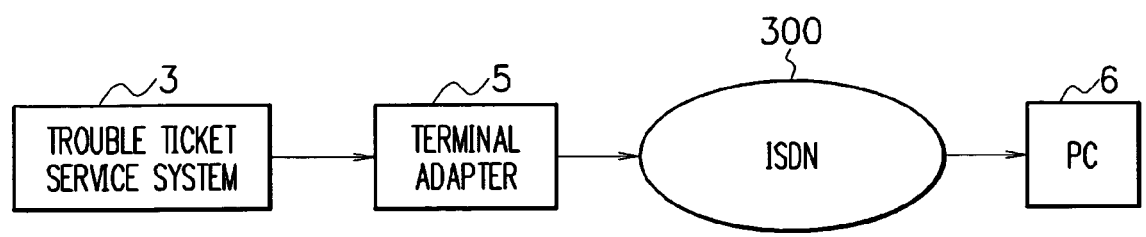
FIG. 6 is a block diagram showing the process to issue a trouble ticket in an additional outline of the trouble ticket service system.
Figure 7:
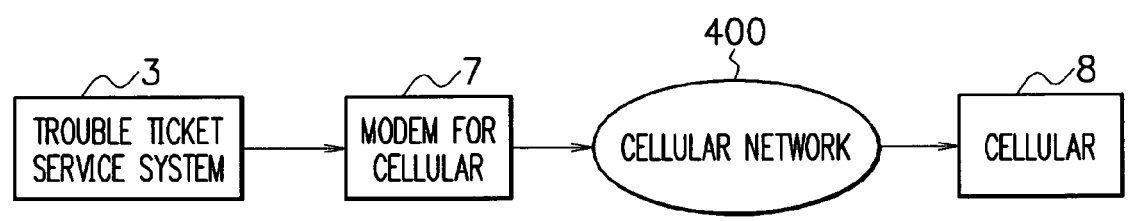
FIG. 7 is a block diagram showing the operation to issue a trouble ticket in another additional outline of the trouble ticket service system.

FIGS. 5 to 7 show, in block diagrams, the operation to issue trouble tickets in the outline of the trouble ticket service system. Referring now to FIGS. 5 to 7, description will be given of the issuance of trouble ticket in the outline.

In the configuration shown in FIG. 5, a trouble ticket service system 3 is coupled via an internet 200 with a cellular phone or a Personal Computer (PC) 4. The service system 3 sends a trouble ticket by e-mail to the internet 200. The ticket is then received by the cellular or PC 4.

In the ticket issuance of FIG. 6, the trouble ticket service system 3 is connected via a terminal adapter 5 and an Integrated Services Digital Network (ISDN) 300 to a personal computer 6. A trouble ticket is issued as an e-mail message from the service system 3 to be fed via the adapter 5 and the ISDN 300 to the personal computer 6.

In the configuration shown in FIG. 7, the trouble ticket service system 3 is linked via a modem for cellular phones 7 and a cellular phone network 400 to a cellular 8. A trouble ticket is issued from the service system 3 to be delivered via the modem 7 to the cellular network 400. The ticket is then received by the cellular 8 connected to the network 400.

In the outlines, since the contents of the trouble tickets are classified into three states namely: the device failure state, the fading state, and the early warning state, it is possible to appropriately distinguish the operation states of the system, which cannot be correctly distinguished in the conventional art. Consequently, the outlines leads to an advantage that the system can immediately deal with the operation state thus determined.

As mentioned above, the present invention is applicable to a microwave radio system in which the three operation states of the system are automatically monitored and information of the operation states is supplied to the maintenance engineer at an early point of time.

While the present invention has been described with reference to the particular illustrative outlines, it is not to be restricted by those outlines but only by the appended claims. It is to be expected that those skilled in this area can change or modify the outlines without departing from the aim and objective of the present invention.

What is claimed is:

1. A trouble ticket service system comprising a monitoring apparatus for receiving alarm information and received electric field information sent from a microwave communication system including at least a microwave communication apparatus, the monitoring apparatus comprising an analyzer for analyzing the alarm information and the received electric field information thereby distinguishing three states from each other namely: device failure state, fading state, and early warning state; and a transmitter for sending the three states as trouble tickets.

2. The trouble ticket service system in accordance with claim 1, wherein the analyzer distinguishes the device failure state when the alarm information indicates failure of the microwave communication apparatus or when an alarm state indicated by the alarm information continues for a predetermined period of time set in advance.

3. The trouble ticket service system in accordance with claim 2, wherein the analyzer distinguishes the fading state when the alarm state is restored within the predetermined period of time and the alarm state occurs in a predetermined number of times set in advance.

4. The trouble ticket service system in accordance with claim 1, wherein the analyzer distinguishes the early warning state when a reception level indicated by the received electric field information is equal to or more than a value set in advance, where the difference between the received electric field information and the value is equal to or more than a second value set in advance, and when the state continues at least a second period of time set in advance.

5. The trouble ticket service system in accordance with claim 1, wherein the transmitter sends the trouble tickets via one of an internet, an Integrated Services Digital Network (ISDN), and a cellular network to a receiving terminal.

6. A monitoring apparatus for receiving alarm information and received electric field information sent from a microwave communication system including at least a microwave communication apparatus, comprising an analyzer for analyzing the alarm information and the received electric field information thereby distinguishing three states from each other namely: device failure state, fading state, and early warning state; and a transmitter for sending the three states as trouble tickets.

7. The monitoring apparatus in accordance with claim 6, wherein the analyzer distinguishes the device failure state when the alarm information indicates failure of the microwave communication apparatus or when an alarm state indicated by the alarm information continues for a predetermined period of time set in advance.

8. The monitoring apparatus in accordance with claim 6, wherein the analyzer distinguishes the fading state when the alarm state is restored within the predetermined period of time and the alarm state takes place in a predetermined number of times set in advance.

9. The monitoring apparatus in accordance with claim 6, wherein the analyzer distinguishes the early warning state when a reception level indicated by the received electric field information is equal to or more than a value set in advance, where the difference between the received electric field information and the value is equal to or more than a second value set in advance, and when the state continues at least a second period of time set in advance.

10. The monitoring apparatus in accordance with claim 6, wherein the transmitter sends the trouble tickets via one of an internet, an ISDN, and a cellular network to a receiving terminal.

11. A trouble ticket service method for use with a system comprising a monitoring apparatus for receiving alarm information and received electric field information sent from a microwave communication system including at least a microwave communication apparatus, comprising the steps of: (1) analyzing the alarm information and the received electric field information thereby distinguishing three states from each other namely: device failure state, fading state, and early warning state; (2) sending the three states as trouble tickets.

12. The trouble ticket service method in accordance with claim 11, wherein the device failure state is identified when the alarm information indicates failure of the microwave communication apparatus or when an alarm state indicated by the alarm information continues for a predetermined period of time set in advance.

13. The trouble ticket service method in accordance with claim 12, wherein the fading state is identified when the alarm state is restored within the predetermined period of time and the alarm state takes place in a predetermined number of times set in advance.

14. The trouble ticket service method in accordance with claim 11, wherein the early warning state is identified when a reception level indicated by the received electric field information is equal to or more than a value set in advance, where a difference between the received electric field information and the value is equal to or more than a second value set in advance, and when the state continues at least a second period of the time set in advance.

15. The trouble ticket service system in accordance with claim 11, wherein the trouble ticket is sent via one of an internet, an ISDN, and a cellular network to a receiving terminal.

16. A computer-readable medium storing a program for use with a trouble ticket service system comprising a monitoring apparatus for receiving alarm information and received electric field information sent from a microwave communication system including at least a microwave communication apparatus, the program causing a computer of the monitoring apparatus to execute the following functions: (1) analyzing the alarm information and the received electric field information thereby distinguishing three states from each other namely: device failure state, fading state, and early warning state; (2) sending the three states as trouble tickets.

* * * * *